United States Patent [19]

Fremont

[11] 4,226,673

[45] Oct. 7, 1980

[54] COLOR REMOVAL FROM PAPER AND PULP MILL AQUEOUS EFFLUENTS

[75] Inventor: Henry A. Fremont, Wyoming, Ohio

[73] Assignee: Champion International Corporation, Stamford, Conn.

[21] Appl. No.: 666,917

[22] Filed: Mar. 15, 1976

[51] Int. Cl.³ .............................................. D21C 11/00
[52] U.S. Cl. ................................ 162/29; 210/500 M; 210/650
[58] Field of Search .................. 210/500 M, 23 F; 162/29, 189, 190

[56] References Cited

U.S. PATENT DOCUMENTS

| | | | |
|---|---|---|---|
| 3,551,244 | 12/1970 | Forester et al. | 156/246 |
| 3,758,405 | 9/1973 | Fremont | 162/29 |
| 3,808,305 | 4/1974 | Gregor | 264/331 |
| 3,951,815 | 4/1976 | Wrasidlo | 210/500 M |
| 3,977,467 | 8/1976 | Trulson et al. | 210/23 F |

OTHER PUBLICATIONS

"Paper Trade Journal", pp. 26-27; Apr. 29, 1974.

*Primary Examiner*—William F. Smith
*Attorney, Agent, or Firm*—Evelyn M. Sommer

[57] ABSTRACT

An improved method for removal of color bodies from aqueous effluents from paper and pulp mill manufacturing operations by ultrafiltration wherein the semipermeable membrane utilized is a polyethyleneimine coated polysulfone film.

5 Claims, 4 Drawing Figures

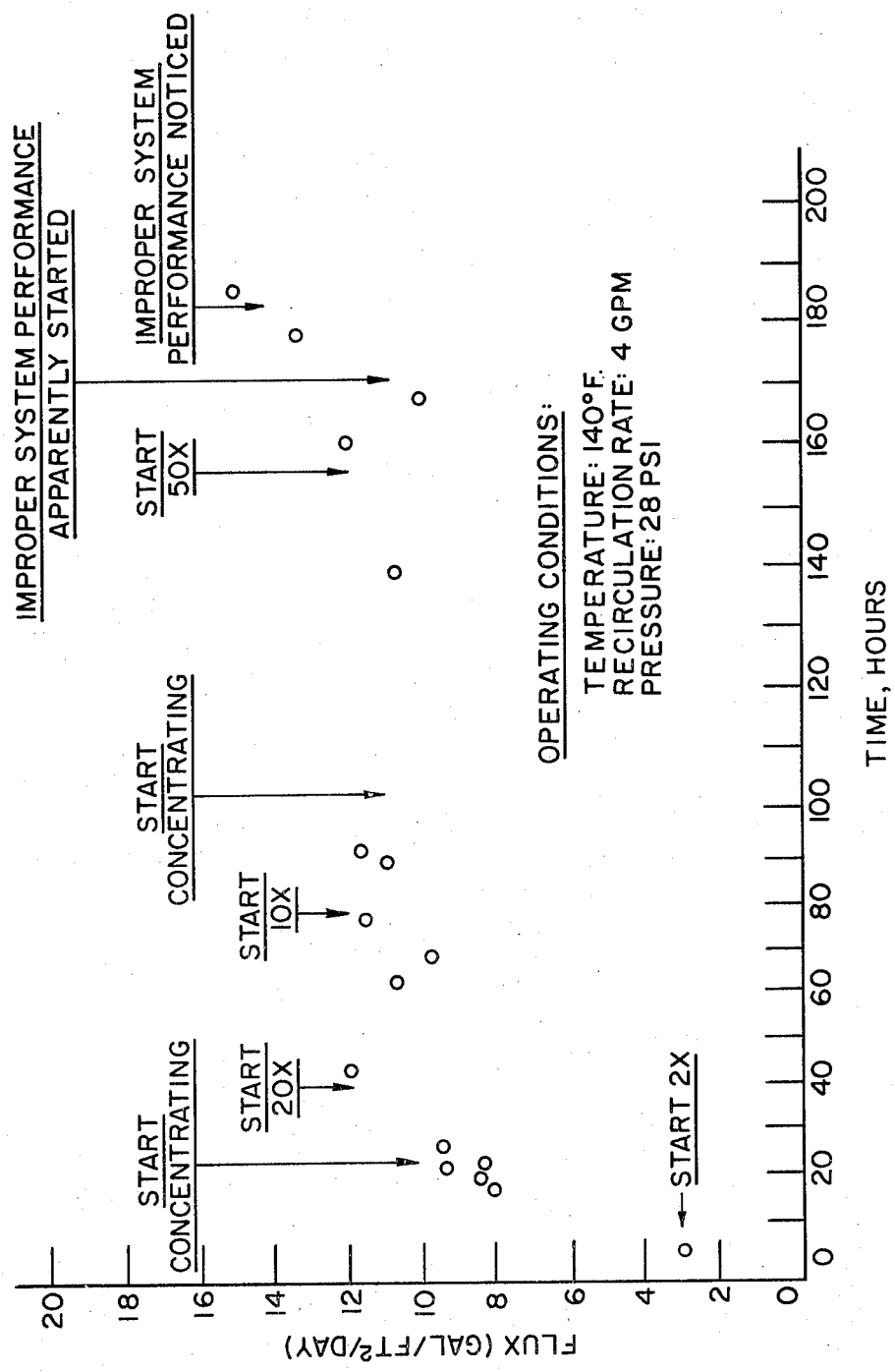

COLOR REMOVAL FROM PAPER AND PULP MILL AQUEOUS EFFLUENTS

BACKGROUND OF THE INVENTION

Pulp and paper manufacture requires the use of large volumes of water. With ever higher antipollution standards and increasing cost of water, it has become necessary to treat the resultant waste water, or effluent, from such operations to control the biological oxygen demand (BOD), color, temperature, and pH thereof prior to its discharge into a watercourse, such as a river, lake, stream, pond, or the like.

While the temperature and pH of the effluents can generally be economically and readily controlled and brought within requisite standards and the BOD also controlled by present techniques, it has not been possible to satisfactorily and economically remove the color bodies from such effluents.

One procedure that has proven operatively satisfactory to remove the color bodies is the ultrafiltration process and system set forth in U.S. Pat. No. 3,758,405. However, such process and system have not been entirely satisfactory for commercial purposes because of cost. The cellulose acetate membranes used have short operational lives due to degradation caused by high heat and high pH and must frequently and with difficulty be cleaned. It has been found that, in operation, such membranes require a daily cleaning and that the pH and temperature of the effluents must be adjusted to about 9 or below and 125° F., preferably about 100° F., respectively, in order to prevent degradation (hydrolysis) of the membrane.

Since paper and pulp plant effluents can and do have a pH up to 14 and a temperature up to 180° F., such effluents must be treated as noted above prior to ultrafiltration in order to lengthen the operational life of the cellulose acetate membranes. Attempts to substitute other membranes, such as fixed charge interpolymer membranes in place of the cellulose acetate membranes, have not proven successful. Such membranes have heretofore also not been capable of satisfactory performance at the high effluent pH's and temperatures.

SUMMARY OF THE INVENTION

An improved process has now been found which permits rapid and economical removal of color bodies from pulp and paper mill aqueous effluents.

The present invention comprises an improved method for removal of color bodies from aqueous effluents from paper and pulp mill manufacturing operations by ultrafiltration wherein the semi-permeable membrane utilized is a polyethyleneimine coated polysulfone film.

DETAILED DESCRIPTION

Figure 1:
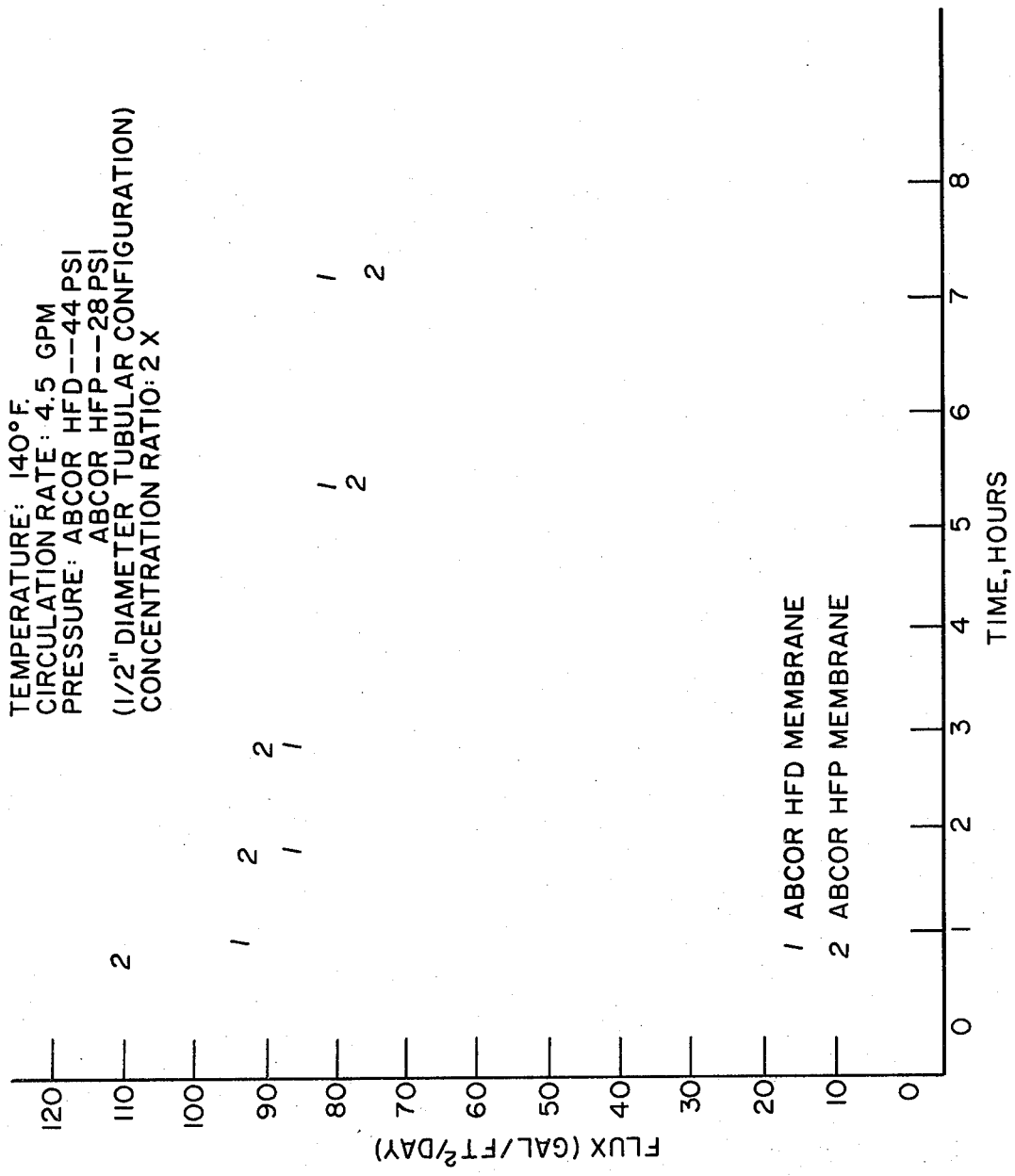

As previously noted, the instant process is suitable for removal of color bodies from all aqueous effluents from paper and pulp plants. Description of the process, however, will be made in connection with the treatment of decker effluents.

Decker effluents from unbleached pulp washing have a natural temperature of about 135° F. and a natural pH of about 11.5. The decker effluents and the caustic extraction filtrate of the pulp bleaching of an integrated kraft mill contribute about 80% to 90% of the color discharged from such a mill.

The ultrafiltration of such decker effluents can be carried out in any ultrafiltration system, but it is preferred to use the system set forth in U.S. Pat. No. 3,758,405 which utilizes spiral wound membranes in stirred cells. The instant process, however, requires that special coated membranes be used. More particularly, the process requires that the membrane be a polysulfone film coated with a thin layer of polyethyleneimine.

Such uncoated polysulfone films are old as is the technique of coating such films with various coatings, including polyethyleneimines. The noted coated films and the method of making them form no part of the instant invention, but their use in ultrafiltration does.

Of particular importance is the fact that no pretreatment of the decker effluent is required prior to ultrafiltration. It can be treated for color removal at the pH and temperature thereof as it leaves the decker. In some instances it may be desirable to first filter the effluent by means of conventional non-molecular filters and polishing filters to remove suspended solids and prevent any fouling of the ultrafiltration membranes by such solids.

The pressure at which the ultrafiltration is carried out can be widely varied. Pressures as low as about 25 p.s.i. on up to 400 p.s.i. can be used, with pressures of about 100 to 200 p.s.i. being preferred since flux and color body retention by the membrane increase with increase in pressure. As in the case of other ultrafiltration membranes, the upper limit of pressure is dependent upon the mechanical strength of the membrane and the degree of membrane compaction.

In commercial operation the number of ultrafiltration cells to be used is determined by the total volume of the effluent stream to be treated, the membrane area, and the separation efficiency which is affected by composition of the effluent pressure of operation, and feed flow rate through the membrane (flux). Once these operating parameters are known, the number of ultrafiltration cells required is easily calculated in the usual manner. In addition, in order to avoid possible membrane fouling and high operating pressures the cells can be arranged in stages separated by pumps so that the effluent stream can be passed sequentially therethrough each stage. In this manner, a single pass through a membrane does not need to give the percentage color removal desired and this gives greater latitude in operation conditions.

The flux is dependent upon the pressure, as discussed above, and upon the concentration of solids in the effluent. The flux decreases with increase in solids.

From the foregoing, the optimum conditions for the process can be readily determined for each particular effluent stream. While 100% removal of the color bodies is theoretically possible, it is not practical in terms of power costs and equipment controls that are required to treat such large volumes of effluent. For this reason, reference to removal of "substantially" all of the color bodies from the effluent stream is intended to mean from about 80 to 95% removal.

It will be understood that the ultrafiltration will also remove other high molecular weight organic materials from the effluent and this is advantageous in that it will further lower the BOD of the permeate when it is discharged into a stream, river, lake or the like.

The color bodies removed from the effluent can be disposed of by incineration as more particularly set forth in U.S. Pat. No. 3,758,405.

The invention will be further described in connection with the following examples which are set forth for purposes of illustration only.

EXAMPLES

A series of tests were run to remove color from decker effluents at natural temperature (135° F.) and natural pH (11.5) using one-half inch diameter tubular membranes. Five different membranes were used; two uncoated polysulfone membranes Abcor HFP and HFD, and such polysulfone membranes coated with three different thicknesses of polyethyleneimine, one 1.0 A (Type C-10) thick, one 5.0 A (Type C-50) thick, and one 20.0 A (Type C-200) thick.

The maximum pressure attainable on the test system used was 45 p.s.i. so low pressures of 28 or 44 p.s.i. were used at a circulation rate of 4.5 gallons per minute. The system was operated at 140° F., warmer than process temperature, to account for heat input from the pumps.

The initial tests, 1 and 2, were performed on the untreated (uncoated) membranes and were run for 7.3 hours at a feed concentration ratio of 2×. The percentage of color removed is set forth below and the membrane flux is shown graphically in FIG. 1 for both untreated Abcor HFD and HFP membranes.

Figure 2:
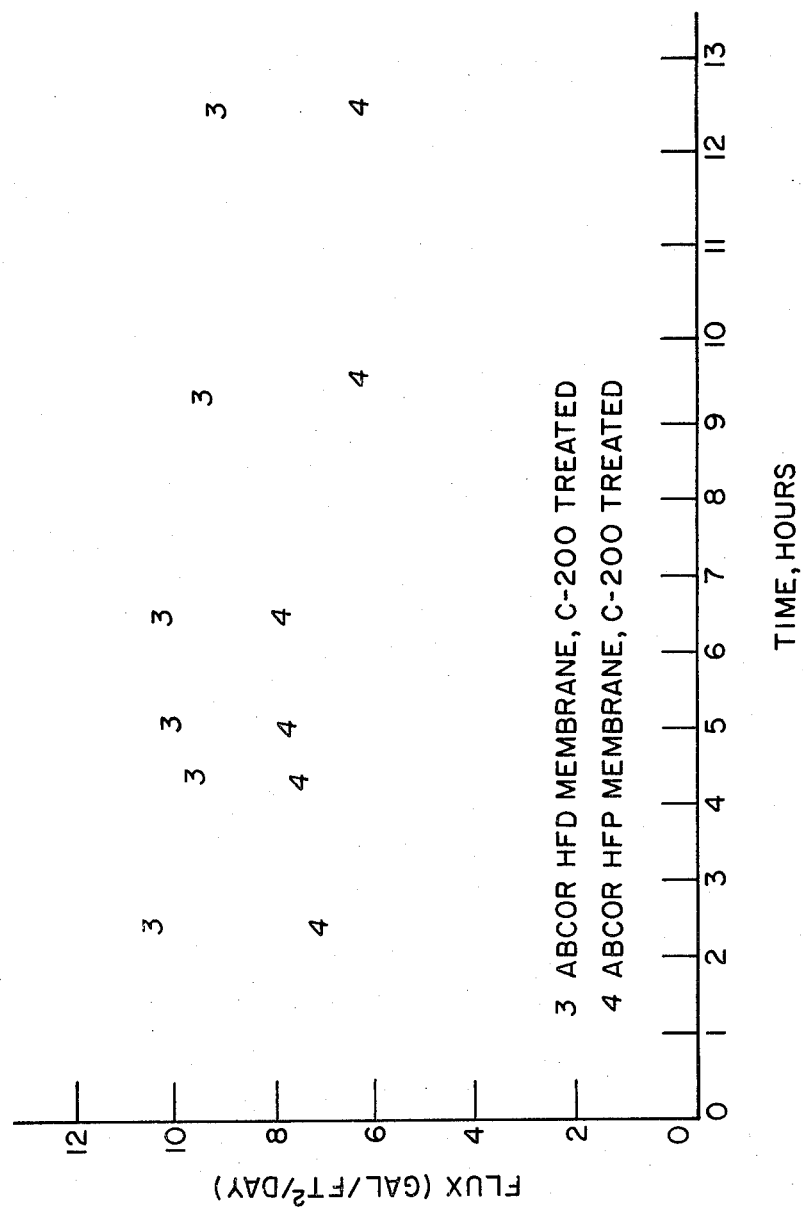

Tests 3 and 4 were run on the Type C-200 coated polysulfone film for 12.5 hours at a concentration ratio of 2× and the membrane rejections are shown in Table I and the flux decrease is graphically depicted in FIG. 2 for Abcor HFD and HFP membranes treated with C-200. The decrease in flux shows that, while the coated membrane gave much superior color rejection than uncoated films, the coating is too thick for optimum commercial operation.

Figure 3:
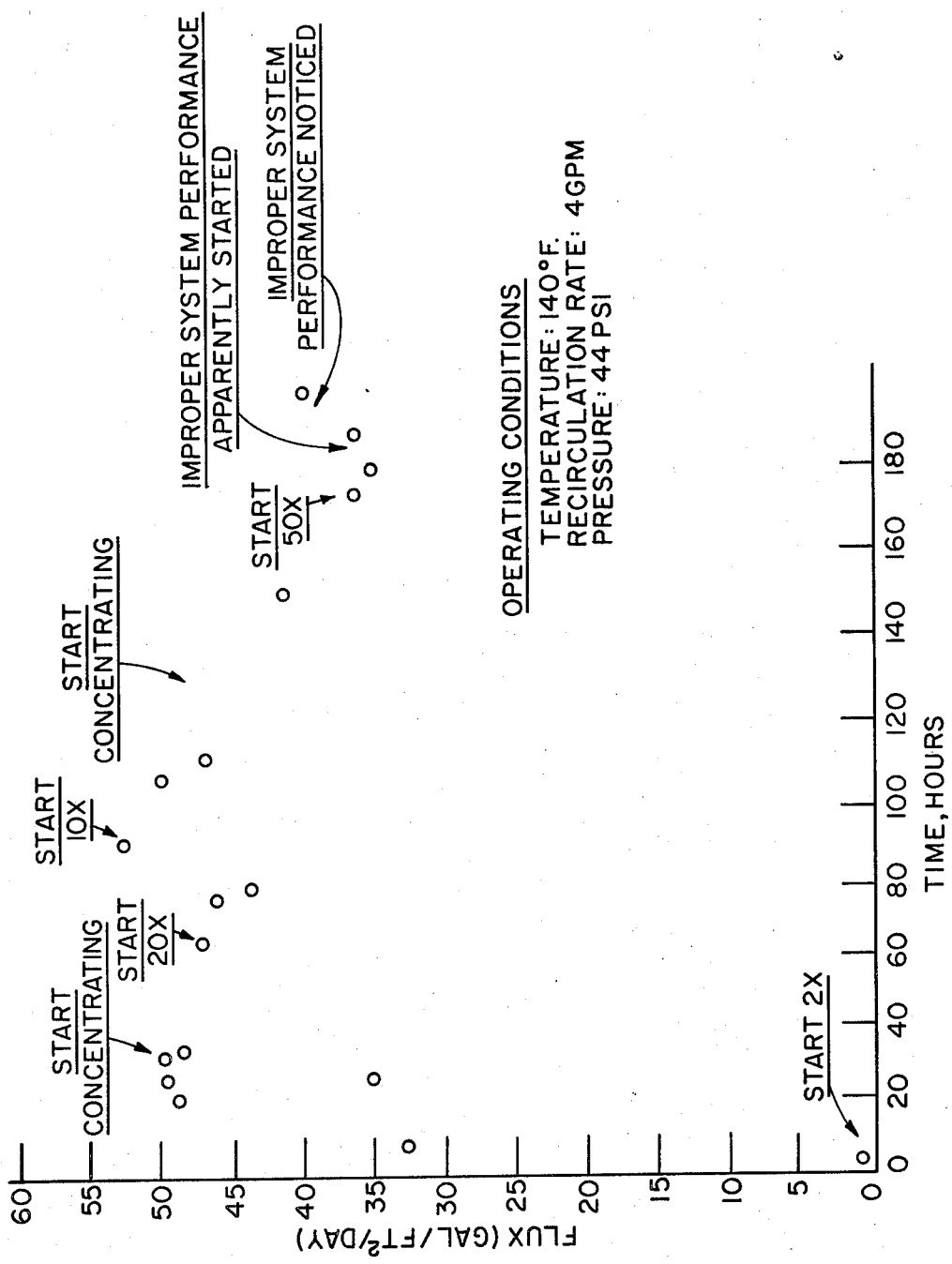

Tests 4 to 10 were run on Type C-10 and C-50 coated membranes for a total of 185 hours at various concentration ratios and the results are set forth in Table I. The flux results are shown graphically in FIGS. 3 and 4 for Abcor HFP membrane treated with C-10 and C-50, respectively. No membrane cleaning was required to maintain the high flux over the 185 hours of testing as opposed to previous work showing that cellulose acetate membranes required cleaning at least once every day.

TABLE I
MEMBRANE REJECTION LEVELS FOR VARIOUS CONSTITUENTS

| Test | Feed Concentration Ratio* | % Rejection Color | TOC | TS | Conductivity |
|---|---|---|---|---|---|
| 1. Abcor HFP (untreated) | 2X | 88 | 70 | 46 | 3 |
| 2. Abcor HFD (untreated) | 2X | 84 | 66 | 39 | 3 |
| 3. Abcor HFP (treated with C-200) | 2X | 96 | 86 | 64 | 29 |
| 4. Abcor HFD (treated with C-200) | 2X | 96 | 85 | 63 | 27 |
| 5. Abcor HFP (treated with C-10) | 2X | 92 | — | — | — |
| 6. Abcor HFP (treated with C-10) | 10X | 98.1 | 93 | 81 | 31 |
| 7. Abcor HFP (treated with C-10) | 20X | 98.3 | 96 | 88 | 36 |
| 8. Abcor HFP (treated with C-50) | 2X | 96 | — | — | — |
| 9. Abcor HFP (treated with C-50) | 10X | 98.1 | 93 | 80 | 28 |
| 10. Abcor HFP (treated with C-50) | 20X | 98.3 | 95 | 86 | 32 |

*volumetric concentration ratio at time samples were collected.

The good results achieved with the coated polysulfone membranes are even better when higher pressures are used. The tests set forth above were performed, as noted, at pressures of 28 or 44 p.s.i. whereas a full-scale commercial system would operate at 100 p.s.i. It is believed that the membranes disclosed herein yielding a flux of 50 gfd and a color rejection of 92% at 44 p.s.i. would yield a flux of 80 gfd and a color rejection of 94% at 100 p.s.i. Such flux is two to three times that attainable by cellulose acetate membranes at the same pressure.

Most importantly, the present invention does not require any treatment of the effluents prior to ultrafiltration. They are used in their "normal" condition; that is, the temperature and pH at which they leave the particular operation of the paper and pulp mill. As previously noted, some filtration for solids may be required of some effluents. There is also the much reduced membrane fouling and consequently much less equipment shut down for membrane cleaning.

As to the membrane, any polysulfone is suitable and the film thereof is made of the usual thickness and pore sizes used for ultrafiltration membranes. Any polyethyleneimine can be used as the coating, and it is preferred that the thickness of such coating be from about 1.0 to 5.0, A, with thicknesses of from about 0.3 to about 15.0 A being suitable.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The method of removing color bodies present in an aqueous effluent from paper and pulp mill manufacturing operations comprising subjecting said effluent having a pH of about 11.5 and a temperature of 135° F. to ultrafiltration through a semi-permeable membrane consisting of polysulfone film coated with polyethyleneimine.

2. The method of claim 1 wherein the effluent is a decker effluent.

3. The method of claim 1 wherein the polyethyleneimine coating has a thickness of from about 0.3 to about 15.0 A.

4. The method of claim 1 including the step of filtering the effluent to remove any suspended solids therein prior to ultrafiltration.

5. The method of claim 1 wherein the polyethyleneimine coating has a thickness of from 1.0 to 5.0 A, the effluent is a decker effluent, and the effluent is filtered to remove any suspended solids prior to ultrafiltration.

* * * * *

UNITED STATES PATENT AND TRADEMARK OFFICE
CERTIFICATE OF CORRECTION

PATENT NO. : 4,226,673

DATED : October 7, 1980

INVENTOR(S) : Henry A. Fremont

It is certified that error appears in the above—identified patent and that said Letters Patent is hereby corrected as shown below:

Column 3, line 21, after "forth" insert -- in Table I --,

Signed and Sealed this

Twenty-third Day of June 1981

[SEAL]

Attest:

RENE D. TEGTMEYER

*Attesting Officer*     *Acting Commissioner of Patents and Trademarks*